US006928525B1

(12) United States Patent
Ebner et al.

(10) Patent No.: US 6,928,525 B1
(45) Date of Patent: Aug. 9, 2005

(54) PER CACHE LINE SEMAPHORE FOR CACHE ACCESS ARBITRATION

(75) Inventors: Sharon M. Ebner, Mountain View, CA (US); John A. Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,907

(22) Filed: Apr. 28, 2000

(51) Int. Cl.[7] .............................................. G06F 12/00
(52) U.S. Cl. ........................ 711/150; 711/151; 711/152; 711/168; 711/145
(58) Field of Search ........................ 711/131, 141, 144, 711/145, 140, 149, 150, 152, 147, 130, 151, 711/165, 167

(56) References Cited

U.S. PATENT DOCUMENTS

| 4,733,352 A | * | 3/1988 | Nakamura et al. ........... 711/152 |
| 5,175,837 A | * | 12/1992 | Arnold et al. ............... 711/152 |
| 5,274,790 A | * | 12/1993 | Suzuki ........................ 711/133 |
| 5,353,425 A | * | 10/1994 | Malamy et al. .............. 711/144 |
| 5,408,629 A | * | 4/1995 | Tsuchiya et al. ............ 711/151 |
| 5,551,005 A | * | 8/1996 | Sarangdhar et al. ......... 711/145 |
| 5,606,679 A | * | 2/1997 | Cohn et al. ..................... 711/4 |
| 5,742,790 A | * | 4/1998 | Kawasaki .................... 711/128 |
| 6,023,748 A | * | 2/2000 | Peters et al. ................. 711/151 |
| 6,032,231 A | * | 2/2000 | Gujral ......................... 711/145 |
| 6,092,159 A | * | 7/2000 | Ekner et al. ................. 711/152 |
| 6,138,218 A | * | 10/2000 | Arimilli et al. ............. 711/146 |

OTHER PUBLICATIONS

Handy, "The Cache Memory Book", 2nd ed., © 1998, p. 67.*
Handy, "The Cache Memory Book",© 1998,Academic Press Inc., 2nd ed., pp. 47-48 & 67.*

* cited by examiner

Primary Examiner—Brian R. Peugh

(57) ABSTRACT

A semaphore mechanism in a multiport cache memory system allows concurrent accesses to the cache memory. When there is no contention for the same cache line, multiple requesters may access the cache memory concurrently. A status bit in each cache line indicates whether that particular cache line is in use, and is used to arbitrate among various requesters for the same cache line. When at least two requests for the same cache line is received, a cache arbiter examines the status bit to determine if the requested cache line is in use. If the cache line is not already in use, the cache arbiter selects, and sends a signal granting the request to, the requesters one at a time to allow access to the contested cache line, while allowing concurrent access to the cache memory to other requesters requesting different cache lines. The semaphore mechanism allows exchanges of signals between the cache arbiter and the requesters to provide an orderly arbitration of multiple requests for the same cache line.

16 Claims, 4 Drawing Sheets

PER CACHE LINE SEMAPHORE FOR CACHE ACCESS ARBITRATION

TECHNICAL FIELD

The invention relates to computer processors and memory systems. More particularly, the invention relates to an arbitration of accesses to a cache memory.

BACKGROUND ART

Processors nowadays are more powerful and faster than ever. So much so that even memory access time, typically in tens of nanoseconds, is seen as an impediment to a processor running at its full speed. Typical CPU time of a processor is the sum of the clock cycles used for executing instructions and the clock cycles used for memory access. While modern day processors have improved greatly in the Instruction execution time, access times of reasonably priced memory devices have not similarly improved. Also, in a modern computer that requires an increasing capacity for I/O bandwidth, the above memory latencies would severely limit the system performance.

A common method to hide the memory access latency is memory caching. Caching takes advantage of the antithetical nature of the capacity and speed of a memory device. That is, a bigger (or larger storage capacity) memory is generally slower than a small memory. Also, slower memories are less costly, thus are more suitable for use as a portion of mass storage than are more expensive, smaller and faster memories.

In a caching system, memory is arranged in a hierarchical order of different speeds, sizes and costs. For example, a smaller and faster memory—usually referred to as a cache memory—is placed between a processor and a larger, slower main memory. The cache memory may hold a small subset of data stored in the main memory. The processor needs only a certain, small amount of the data from the main memory to execute individual instructions for a particular application. The subset of memory is chosen based on an immediate relevance, e.g., likely to be used in the near future based on the well known "locality" theories, i.e., temporal and spatial locality theories. This is much like borrowing only a few books at a time from a large collection of books in a library to carry out a large research project. Just as research may be as effective and even more efficient if only a few books at a time were borrowed, processing of an application program is efficient if a small portion of the data was selected and stored in the cache memory at any one time.

A cache generally includes status bits with each line of data (hereinafter referred to as a "cache line"), e.g., most commonly, a valid bit that indicates whether the cache line is currently in use or if it is empty, and a dirty bit indicating whether the data has been modified. An input/output (I/O) cache memories may store more status information to for each cache line than a processor cache, e.g., keep track of the identity of the I/O device requesting access to and/or having ownership of a cache line. In an I/O cache memory, these status bits are changed by transactions such as DMA writes to the cache line, snoops, new fetches being issued using the cache line, and fetches returning from memory with data and/or ownership, or the like.

When more than one event, e.g., multiple requests, happens to the same cache line, the correct order in which the events are allowed to occur must be ensured to prevent an erroneous result. For example, if a cache line is being modified by a write operation by one cache user, and at the same time, is being snooped out by another cache user, the data must be written fully before the snoop can be performed.

Prior attempts to ensure the above correct order of events includes an arbitration of accesses to the cache memory, in which only one of the events is allowed an access the cache memory at a time regardless of whether the events are attempting to access the same cache line.

Another attempt to ensure the above correct order of events is to design the system with timing requirement that prevents overlap of the critical events that may interfere with each other if allowed access to the cache at the same time. In these systems, e.g., delays may be added to some events, e.g., a snoop operation, so as not to occur before another event, e.g., a write function.

Unfortunately, these prior attempted solutions are inefficient and severely limit performance, e.g., of a multi-ported cache memory (with multiple TAG lookup ports and/or multiple data ports), because it allows only one transaction to occur at a time, i.e., serializes the transactions.

Moreover, the non-overlapping timing system requires considerable complexity and time in designing and testing, and because all possible events must be accounted for and evaluated, is prone to unexpected failures, i.e., bugs. Typically, a unique timing solutions, e.g., amount of delay and the like, is required for each possible overlapping pair of events. Thus, there can be no uniform approach in dealing with various combination of events, and thus it is very difficult to develop design rules that can be applied without having an adverse effect on at least some aspect of the system.

Thus, there is a need for more efficient method and device for a per cache line arbitration between multiple cache access requests that permits multiple concurrent access to cache lines.

There is a further need for a more efficient and faster method and device for an arbitration between multiple cache access requests that provides a uniform approach in dealing with various combination of cache access events.

SUMMARY OF INVENTION

In accordance with the principles of the present invention, a method of, and an apparatus for, arbitrating a plurality of cache access requests to a cache memory having a a plurality of cache lines and a plurality of access ports comprises steps of, and means for, respectively, detecting requests to access the cache memory from a plurality of requesters, determining whether at least two of the plurality of requesters are seeking access to an identical one of the plurality of cache lines, and allowing, if the at least two of the plurality of requesters are not seeking access to the identical one of the plurality of cache lines, the plurality of requesters to concurrently access the cache memory through the plurality of access ports.

In addition, in accordance with the principles of the present invention, a cache memory system comprises a cache memory having a plurality of cache lines and a plurality of access ports, a plurality of semaphore status bits each corresponding to respective ones of the plurality of cache lines, each of the plurality of semaphore status bits, when set, indicating a corresponding one of the plurality of cache lines is currently being accessed, and when cleared, indicating the corresponding one of the plurality of cache lines is currently not being accessed, and a cache arbiter configured to receive a plurality of requests for access to the cache memory from a plurality of requester, the arbiter being configured to allow the plurality of requesters to concurrently access the cache memory through the plurality of access ports if ones of the plurality of cache lines being requested by the plurality of requests are not already being accessed based on respective associated ones of the plurality of semaphore status bits, and the arbiter further being configured to determine if at least two of the plurality of requests do not request access to an identical one of the plurality of cache lines.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplar embodiment thereof, particularly with references to an example in which there are two requesters for a cache line. However, one of ordinary skill in the art would readily recognize that the same principles are equally applicable to, and can be implemented in, a cache memory system having any number of requesters, and that any such variation would be within such modifications that do not depart from the true spirit and scope of the present invention.

In accordance with the principles of the present invention, a semaphore mechanism is provided in a multiport cache memory system to allow concurrent accesses to the cache memory. When there is no contention for the same cache line, multiple requesters may access the cache memory concurrently. A status bit in each cache line indicates whether that particular cache line is in use, and is used to arbitrate among various requesters for the same cache line.

When at least two requests for the same cache line is received, a cache arbiter examines the status bit to determine if the requested cache line is in use. If the cache line is not already in use, the cache arbiter selects, and sends a signal granting the request to, the requesters one at a time to allow access to the contested cache line, while allowing concurrent access to the cache memory to other requesters requesting different cache lines.

The semaphore mechanism allows exchanges of signals between the cache arbiter and the requesters to provide an orderly arbitration of multiple requests for the same cache line.

Figure 1:
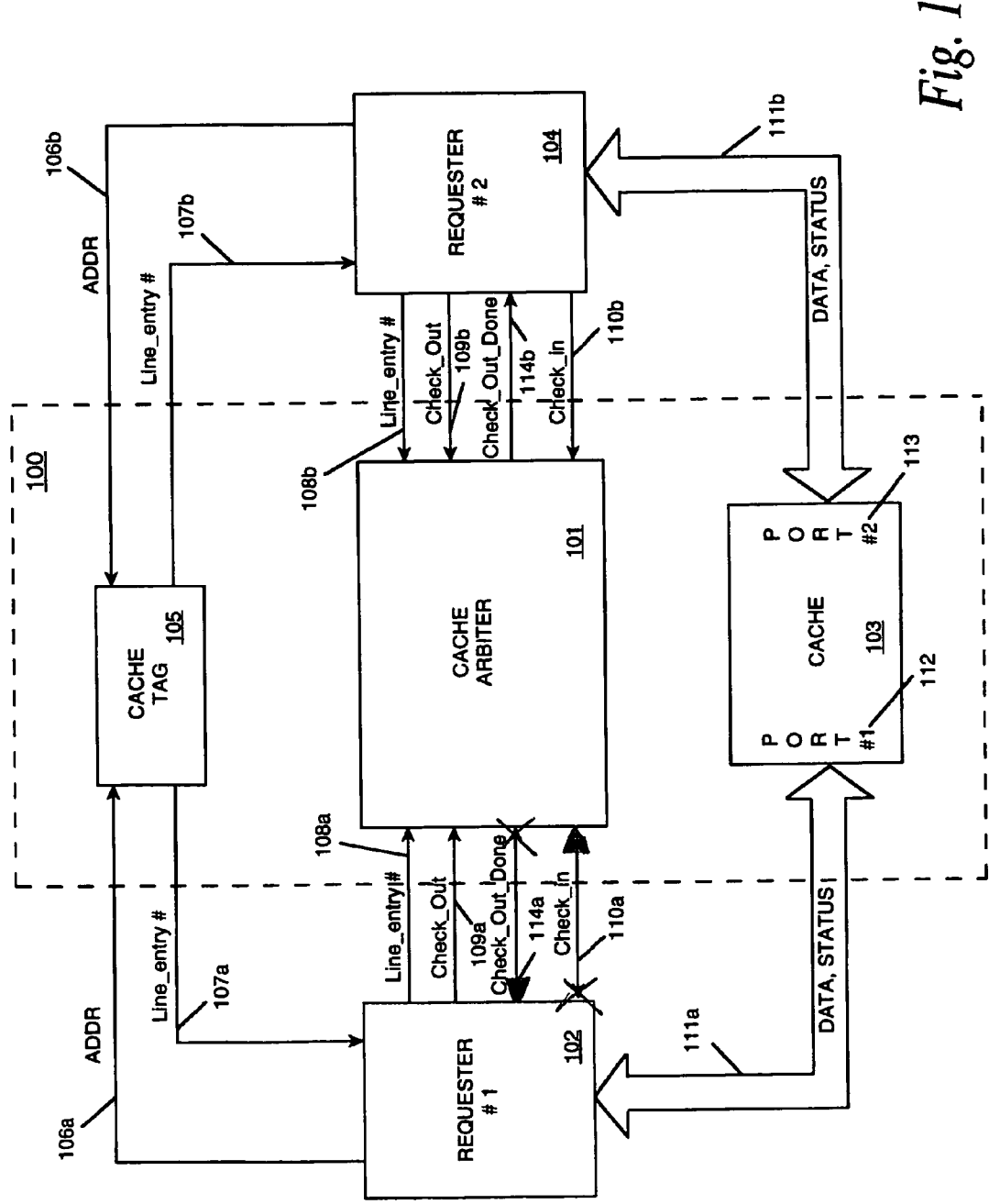
FIG. 1 is a block diagram of an exemplary embodiment of the cache memory system in accordance with the principles of the present invention.

In particular, FIG. 1 shows an exemplary embodiment of cache system 100 in accordance with the present invention. The cache system 100 may comprise a cache arbiter 101, a cache memory 103 and a cache tag 105. The cache memory 103 may include a plurality of cache lines stored therein, a plurality of access ports, e.g., port#1 112 and port#2 113, to allow a plurality of requesters, e.g., requester#1 102 and requester#2 104, to access cache memory 103 concurrently through a plurality of data buses, e.g., buses 11a and 11b. The requesters 102 and 104 may be any entity in a computing system that may request access to the cache memory 103, and may include, e.g., processors, input output (I/O) devices, direct memory access (DMA) controller and the like. By way of example, only two access ports and two requesters are shown in FIG. 1. However, it should be apparent to those having ordinary skill in the art that any number of access ports and requesters may be included.

When any of the plurality of requesters desires an access to the cache memory 103, the requester presents the address, e.g., ADDR 106a and 106b, of the cache line to be accessed to the cache tag 105, and obtains therefrom a line entry number, e.g., line entry numbers 107a and 107b. The requester then requests an access to the cache memory by presenting the line entry number along with a request signal, e.g., a CHECK_OUT signal, via signal paths, e.g. 108a or 108b and 109a or 109b, respectively.

Upon receiving the line entry number and the CHECK_OUT signal from one or more requesters, the cache arbiter 101 determines the availability of the requested cache line for access by the requester(s), and if the cache line is available, grants the request by, e.g., sending a CHECK_OUT_DONE signal to the requester via a signal path, e.g., the signal paths 114a and/or 114b.

When the requester is finished accessing the cache line, it sends a CHECK-IN signal to the cache arbiter 101 via a signal path, e.g., signal paths 110a and/or 110b.

The cache arbiter 101 in accordance with the principles of the present invention, allows a concurrent access of the cache memory 103 by a plurality of requesters when the requested cache lines are currently available for access. In accordance with the principles of the present invention, a semaphore status bit, CHECKED_OUT bit, is provided for each of the plurality of cache lines in the cache memory 103. The status CHECKED_OUT bit enable the cache arbiter 101 to make a determination whether a requested cache line is available for access.

Figures 2A, 2B:
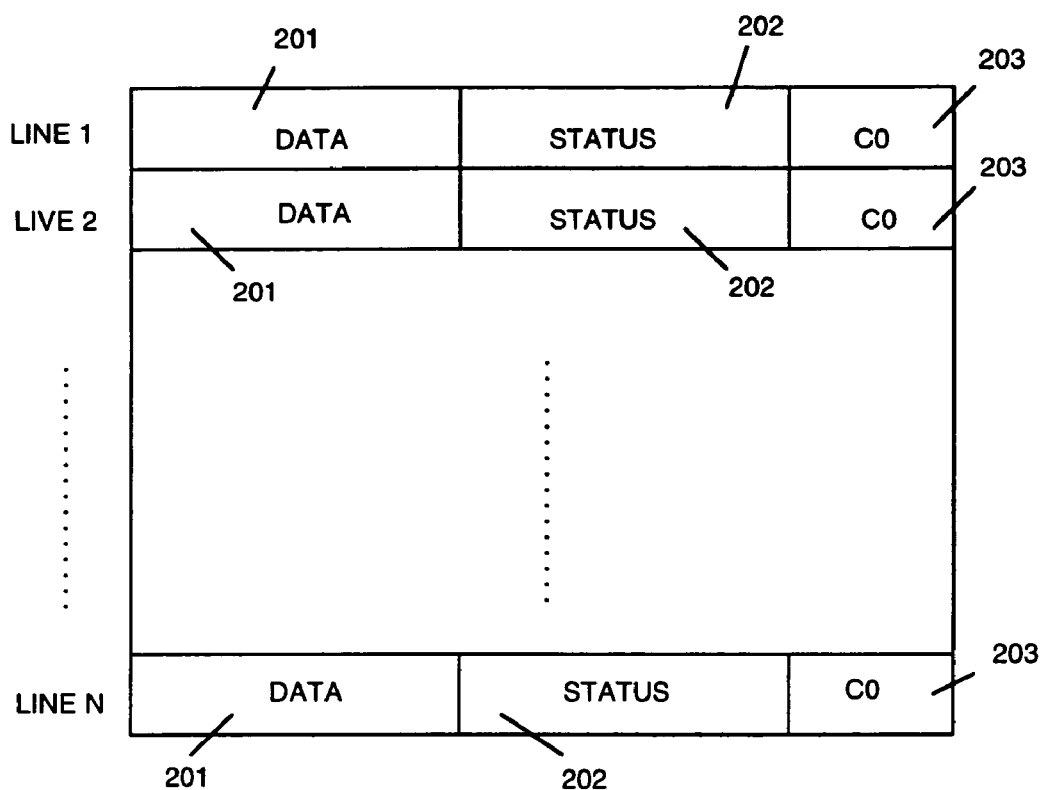
FIG. 2A is an illustrative table showing relevant portions of an exemplary cache memory in accordance with an embodiment of the present invention.
FIG. 2B is an illustrative table showing relevant portions of an exemplary semaphore status table in accordance with an embodiment of the present invention.

In particular, shown in FIGS. 2A and 2B are ones of many possible implementations of the semaphore status bits. FIG. 2A shows the relevant portions of the cache memory 103, which may include for each of the cache lines, lines 1 through n, a data field 201 and a status field 202. As shown in FIG. 2A, the semaphore status bit(s), CHECKED_OUT bit(s) may be included in each of the cache lines in the cache memory 103. In this example, the CHECKED_OUT bits (CO) 203 are encoded in each of the cache lines as a part of the status field 202.

Alternatively, a look-up table 204 may be constructed, e.g., as shown in FIG. 2B, that may include in relevant part, line entry numbers 205 and CHECKED_OUT bit(s) filed 206. The look-up table may be stored anywhere from which the cache arbiter 101 can have access to read and/or modify, e.g., the cache memory 103, the cache arbiter 101 or the cache tag 105, or even in an entity outside the cache system 100.

An exemplary embodiment of the cache access process in accordance with the present invention will now be described in detail with references to FIGS. 3 and 4.

Figure 4:
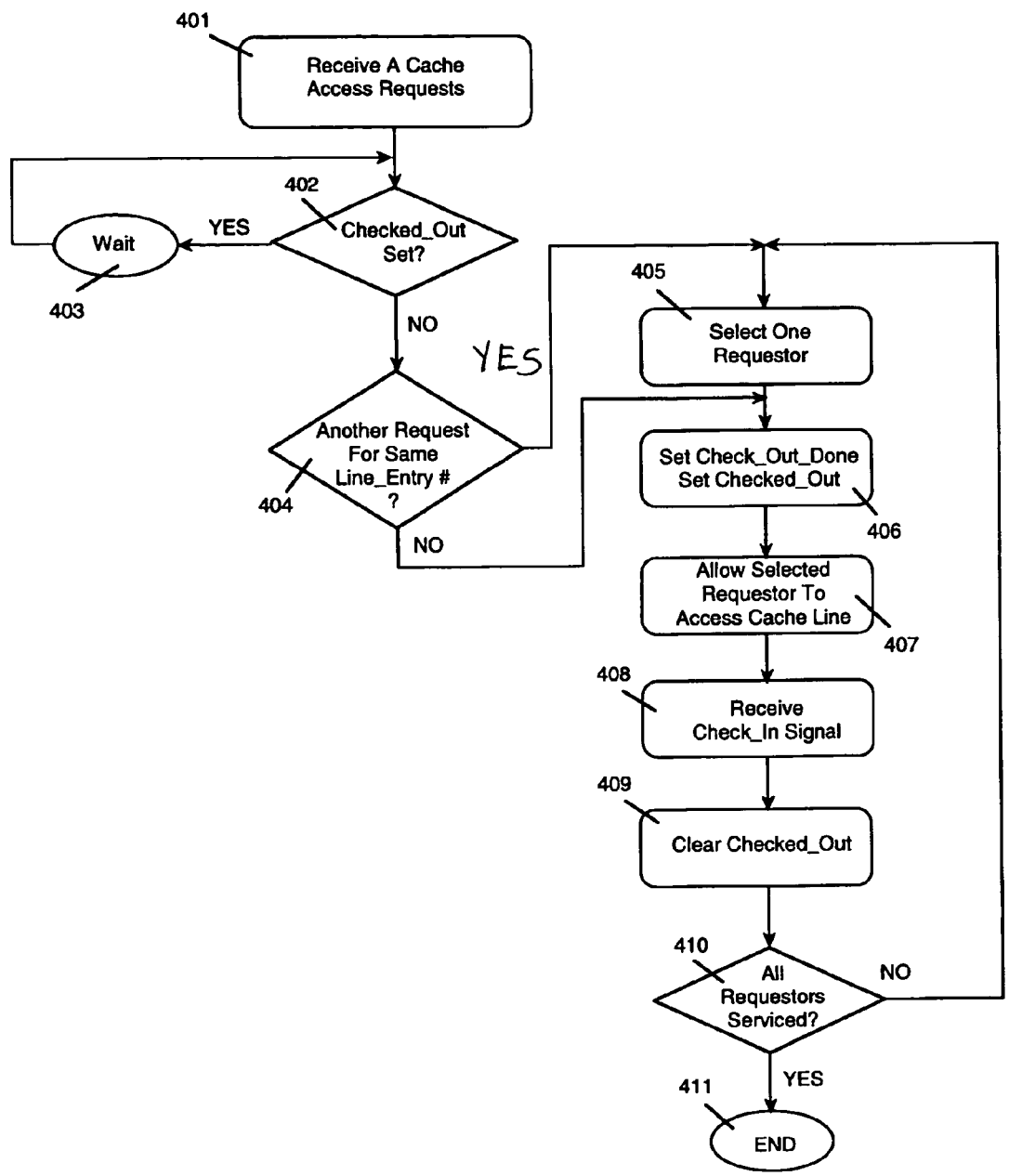
FIG. 4 is flow diagram illustrative of an exemplary embodiment of the cache access arbitration process in accordance with an embodiment of the principles of the present invention.

As shown in FIG. 4, when the cache arbiter 101 receives a cache access request in step 401, e.g., by receiving a cache entry number and a CHECK_OUT signal from a requester, the cache arbiter 101, in step 402, examines the CHECKED_OUT bit(s) associated with the requested cache line to determine if the requested cache line is available. If the CHECKED_OUT bit(s) for the particular requested cache line is set, e.g., to a value of 1, then the cache line is being accessed by a prior requester, and thus the cache arbiter waits, in step 403, until the CHECKED_OUT bit(s) is cleared, e.g., until a CHECK_IN signal is received from the prior requester. Moreover, the cache arbiter 101 allows other requesters that are not requesting the same cache lines to continue accessing the cache memory 103 through the other ones of the multiple access ports.

If the CHECKED_OUT bit(s) for the cache line is cleared, the process proceeds to step 404, in which the cache arbiter 101 determines whether there is at least one other request for access of the same line entry number corresponding to the requested cache line.

If it is determined that the at least one other requester is seeking access to the same cache line, the cache arbiter 101 selects one requestor among the requesters seeking the same cache line in step 405.

Figure 3:
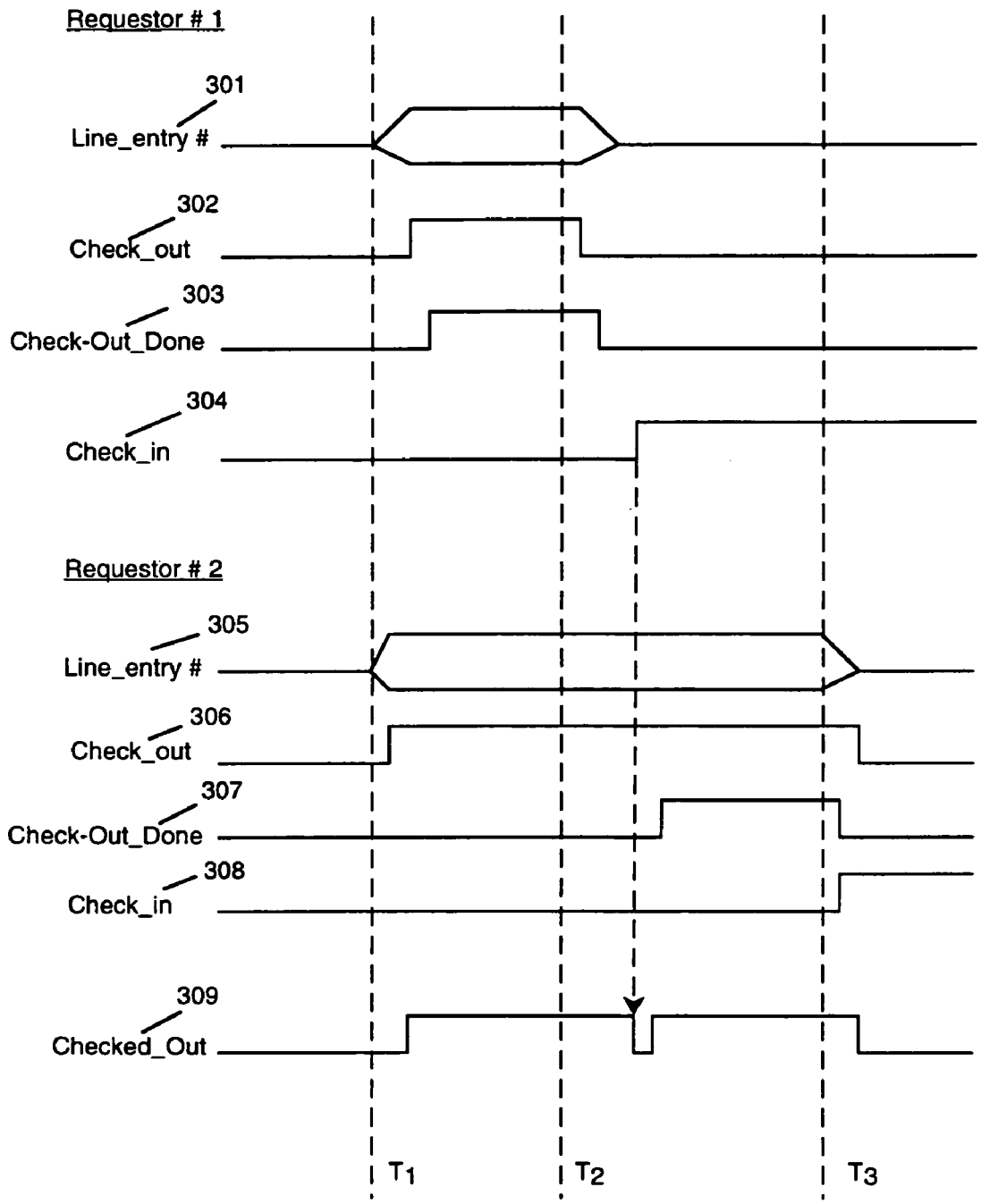
FIG. 3 is a timing diagram showing an exemplary timing of various signals being exchanged between a cache arbiter and two cache access requesters in accordance with an embodiment of the present invention.

For example, FIG. 3 shows an exemplary timing diagram of the various signals between the at least two requesters that are requesting the same cache line, e.g., the line n. In particular, shown in this example are the two requesters, requester#1 and requester #2, each presenting line entry number 301 and 305 corresponding to the cache line, line n, and sending the CHECK_OUT signals 302 and 306, respectively. Although in this example, the requests are shown to be made simultaneously, i.e., during the time period T1, the requests may be made in different times. For example, the request from the request#1 may have been made before the time period T1.

Once a requester is selected, or if it is determined that no other requests for the same cache line in step 404, the process proceeds to step 406. In step 406, the arbiter 101 sends a CHECK_OUT_DONE signal to the selected requester, and at the same time sets the CHECKED_OUT bit(s) associated with the requested cache line to indicate that the cache line is in use. This is illustrate in FIG. 3. As shown, in the case of multiple requesters for the same cache line, during the time period T1, the CHECKED_OUT_DONE signal 303 is sent to the selected requester, e.g., the requester#1, while the CHECKED_OUT_DONE signal 306 to the requester#2 remains inactive. It can be seen that the CHECKED_OUT bit 309 is also set to high at the same time the CHECKED_OUT_DONE signal 303 is sent to the requester#1.

The selected requester, e.g., the requester#1, accesses the cache line in step 407, and once the access is completed, in step 408, sends a CHECK_IN signal to the cache arbiter 101 as also shown in FIG. 3, which shows the CHECK_IN signal 304 from requester#1 being asserted during the time period T2. Although, in FIG. 3, each of the requesters are shown to access the cache line during one clock cycle, the accesses may take any number of clock cycles. In a preferred embodiment of the present invention, the cache arbiter 101 maintains the time of start of an access, e.g., a time stamp, which is used to terminate a pending access from a requester if a CHECK_IN signal 304 is not received from the requester within a predetermined number of clock cycles to provide a fair arbitration of the cache lines, e.g., to prevent a starvation situation. The predetermined number of clock cycle may be configurable by a user of the system and/or by the system software.

Once the CHECK_IN signal 304 is received, the cache arbiter 101 clears the CHECKED_OUT bit(s) for the cache line in step 409. This can be seen in FIG. 3, in which the CHECKED_OUT bit(s) 309 is cleared at substantially the same time the CHECK_IN signal 304 is received in time period T2.

Then, in step 410, the cache arbiter 101 determines whether all requesters that requested the cache line were given access. If any requester(s) that had requested the cache line and not yet given access to the cache line remains, the process loops back to the step 405 in which the cache arbiter 101 selects another requester from the remaining requesters, and steps 406 through 410 are repeated until all requesters are serviced, and process ends in step 413 when there are no more remaining requester seeking the same cache line. For example, FIG. 3, shows, during the time period T2, the requester#2 is selected and receives the CHECKED_OUT_DONE signal 306, and allowed access to the cache line.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of arbitrating a plurality of cache access requests to a cache memory having a plurality of cache lines and a plurality of access ports, comprising:

detecting requests to access said cache memory from a plurality of requesters;

determining whether at least two of said plurality of requesters are seeking access to an identical one of said plurality of cache lines;

allowing, if said at least two of said plurality of requesters are not seeking access to said identical one of said plurality of cache lines, said plurality of requesters to concurrently access said cache memory through said plurality of access ports;

selecting, if at least two of said plurality of requesters are seeking access to said identical one of said plurality of cache lines, a selected one of said plurality of requester that is seeking access to said identical cache line;

allowing, said selected one of said plurality of requesters and other ones of said plurality of requesters that are not seeking said identical one of said plurality of cache lines to concurrently access said cache memory;

receiving a signal indicating a completed access of said cache memory from said selected one of said plurality of requesters;

selecting another one of said plurality of requesters seeking access to said identical one of said plurality of cache lines; and allowing, said selected one of said plurality of requesters and other ones of said plurality of requesters that are not seeking said identical one of said plurality of cache lines to concurrently access said cache memory.

2. The method of arbitrating a plurality of cache access requests in accordance with claim 1, further comprising:
   providing each of said plurality of cache lines a semaphore status bit indicating whether respective corresponding one of said plurality of said cache lines is currently being accessed; and
   preventing access to a requested one of said plurality of cache lines if said semaphore status bit associated with said requested one of said plurality of cache lines indicates said requested one of said plurality of cache lines is currently being accessed.

3. The method of arbitrating a plurality of cache access requests in accordance with claim 2, further comprising:
   setting, upon allowing access to said requested one of said plurality of cache lines, said semaphore status bit associated with said requested one of said plurality of cache lines to indicate said requested one of said plurality of cache lines currently being accessed.

4. The method of arbitrating a plurality of cache access requests in accordance with claim 3, further comprising:
   clearing, upon receiving said signal indicating a completed access of cache memory, said semaphore status bit associated with said requested one of said plurality of cache lines to indicate said requested one of said plurality of cache lines currently not being accessed.

5. An apparatus for arbitrating a plurality of cache access requests to a cache memory having a plurality of cache lines and a plurality of access ports, comprising:
   means for detecting requests to access said cache memory from a plurality requesters;
   means for determining whether at least two of said plurality of requesters are seeking access to an identical one of said plurality of cache lines;
   means for allowing, if said at least two of said plurality of requesters are not seeking access to said identical one of said plurality of cache lines, said plurality of requesters to concurrently access said cache memory through said plurality of access ports;
   means for selecting, if at least two of said plurality of requesters are seeking access to said identical one of said plurality of cache lines, a selected one of said plurality of requester that is seeking access to said identical cache line;
   means for allowing, said selected one of said plurality of requesters and other ones of said plurality of requesters that are not seeking said identical one of said plurality of cache lines to concurrently access said cache memory;
   means for receiving a signal indicating a completed access of said cache memory from said selected one of said plurality of requesters;
   means for selecting another one of said plurality of requesters seeking access to said identical one of said plurality of cache lines; and
   means for allowing, said selected one of said plurality of requesters and other ones of said plurality of requesters that are not seeking said identical one of said plurality of cache lines to concurrently access said cache memory.

6. An apparatus for arbitrating a plurality of cache access requests according to claim 5, further comprising:
   means for providing each of said plurality of cache lines a semaphore status bit indicating whether respective corresponding one of said plurality of said cache lines is currently being accessed; and
   means for preventing access to a requested one of said plurality of cache lines if said semaphore status bit associated with said requested one of said plurality of cache lines indicates said requested one of said plurality of cache lines is currently being accessed.

7. An apparatus for arbitrating a plurality of cache access requests according to claim 6, further comprising:
   means for setting, upon allowing access to said requested one of said plurality of cache lines, said semaphore status bit associated with said requested one of said plurality of cache lines to indicate said requested one of said plurality of cache lines currently being accessed.

8. An apparatus for arbitrating a plurality of cache access requests according to claim 7, further comprising:
   means for clearing, upon receiving said signal indicating a completed access of cache memory, said semaphore status bit associated with said requested one of said plurality of cache lines to indicate said requested one of said plurality of cache lines currently not being accessed.

9. A cache memory system, comprising:
   a cache memory having a plurality of cache lines and a plurality of access ports;
   a plurality of semaphore status bits each corresponding to a respective ones of said plurality of cache lines, each of said plurality of semaphore status bits, when set, indicating a corresponding one of said plurality of cache lines is currently being accessed, and when cleared, indicating said corresponding one of said plurality of cache lines is currently not being accessed; and
   a cache arbiter configured to receive a plurality of requests for access to said cache memory from a plurality of requesters, said arbiter being configured to allow said plurality of requesters to concurrently access said cache memory through said plurality of access ports if ones of said plurality of cache lines being requested by said plurality of requests are not already being accessed based on respective associated ones of said plurality of semaphore status bits, and said arbiter further being configured to determine if at least two of said plurality of requests do not request access to an identical one of said plurality of cache lines,
   wherein said cache arbiter is configured, upon receiving a signal indicating completion of access to said identical one of said plurality of said cache lines from said selected one of said at least two of said plurality of requesters, to clear said associated one of said plurality of semaphore status bit corresponding to said identical one of said plurality of cache lines, and to select another one of said at least two of said plurality of requesters.

10. The cache memory system according to claim 9, wherein:
    said cache arbiter is configured, if said at least two of said plurality of requests request access to said identical one of said plurality of cache lines, to select a selected one of said at least two of said plurality of requesters, and if an associated one of said plurality of semaphore status bits corresponding to said identical one of said plurality of cache lines is not currently being accessed, to allow said selected one of said at least two of said plurality of requesters to access said identical one of said plurality of cache lines.

11. The cache memory system according to claim 10, wherein:
    said cache arbiter is configured to set said associated one of said plurality of semaphore status bits corresponding to said identical one of said plurality of cache lines upon granting said access to said selected one of said at least two of said plurality of requesters.

12. The cache memory system according to claim 9, wherein:

said cache arbiter is configured, upon receiving a signal indicating completion of access to said identical one of said plurality of said cache lines from said selected one of said at least two of said plurality of requesters, to allow said another one of said at least two of said plurality of requesters to access said identical one of said plurality of cache lines.

13. The cache memory system according to claim 12, wherein:

said cache arbiter is configured to set said associated one of said plurality of semaphore status bits corresponding to said identical one of said plurality of cache lines upon granting said access to said another one of said at least two of said plurality of requesters.

14. The cache memory system according to claim 9, wherein:

said plurality of semaphore status bits are stored within respective corresponding cache lines.

15. The cache memory system according to claim 9, wherein:

said plurality of semaphore status bits are stored within said cache arbiter.

16. The cache memory system according to claim 9, wherein:

said plurality of semaphore status bits are stored within a look-up table.

* * * * *